Feb. 18, 1969

H. T. ROBINSON 3,427,739

COMBINED TOP LOAD STACK SLIDE ADAPTER AND PROJECTOR

Filed Jan. 23, 1967

Sheet _1_ of 4

HERBERT T. ROBINSON
INVENTOR.

BY

ATTORNEYS

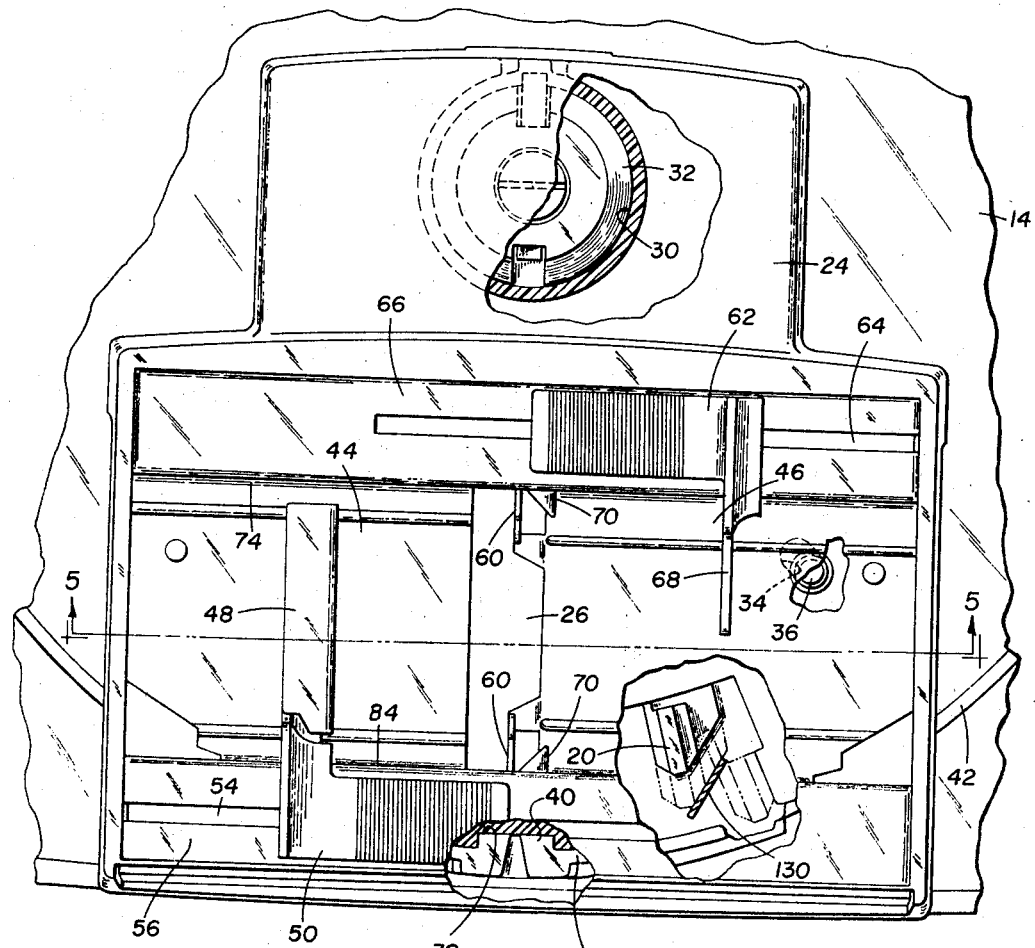

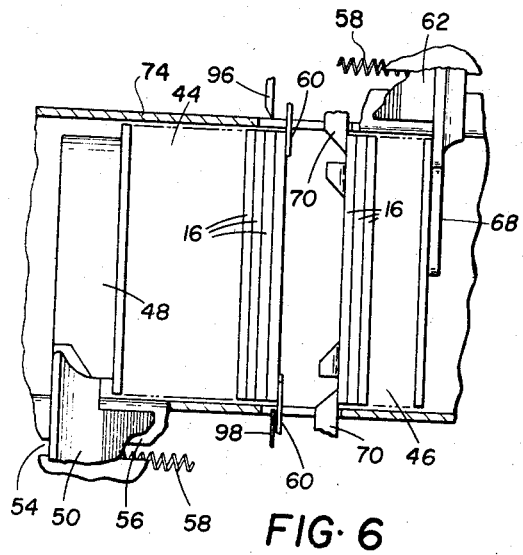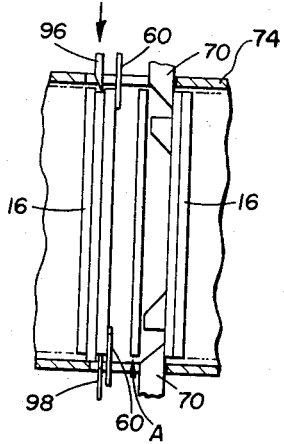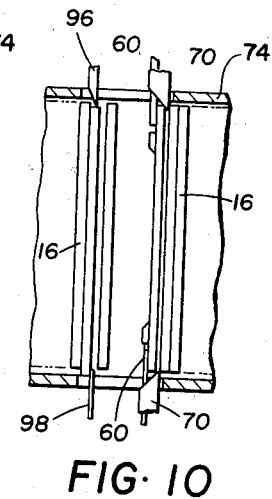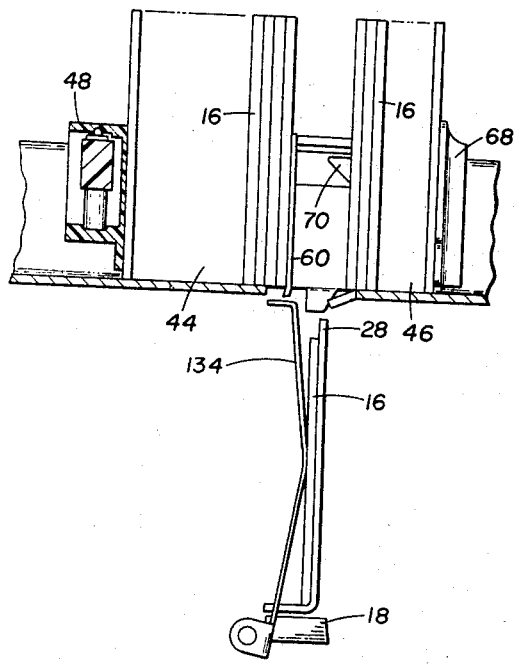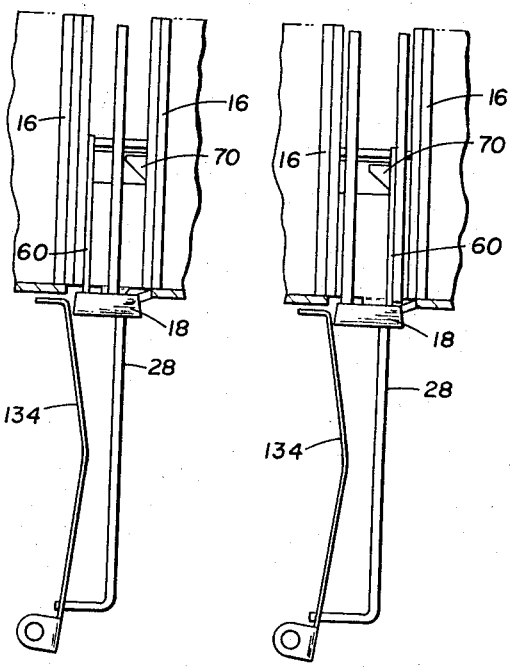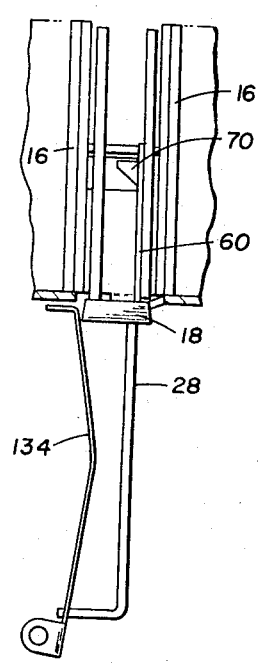

HERBERT T. ROBINSON
INVENTOR.

ATTORNEYS

United States Patent Office 3,427,739
Patented Feb. 18, 1969

3,427,739
COMBINED TOP LOAD STACK SLIDE ADAPTER AND PROJECTOR
Herbert T. Robinson, Rochester, N.Y., assignor to Eastman Kodak Company, Rochester, N.Y., a corporation of New Jersey
Filed Jan. 23, 1967, Ser. No. 610,994
U.S. Cl. 40—79         15 Claims
Int. Cl. G09f *11/30;* G03b *23/04*

ABSTRACT OF THE DISCLOSURE

A combined top load stack slide adapter and projector for handling a stack of slides which are transported one at a time by gravity into a projecting position for projection on a screen. The stack slide adapter comprises, among other things, means for releasably holding the second slide in the stock while the first or leading slide is being transported to the projecting position.

---

This invention relates generally to projectors, and more specifically to a combined top load stack slide adapter and projector.

Slide projectors of the type for supporting a stack of slides which are transported one at a time to and from a projecting position for projection on a screen are well known in the art. This invention is directed to a combined top load slide adapter and projector of this type in which the slide adapter and projector are separate cooperable units, rather than a projector in which the stack slide adapter is integrally built in. One advantage of the top load stack slide adapter and projector, whether integral or in separate units, is the elimination of a slide tray. Furthermore, having the slides located above the slide projection position provides easy access to the slides which are in full view. The location of the slides above the slide projecting position so that the transport thereof to the projecting position may be accomplished by the action of gravity provides a jam-proof projection system in which mutilated or deformed slides are transported to and from the slide projecting position without any difficulty. Such a projection system further provides easy access to the projected slide in the projection position.

This invention includes within its scope a combined top load stack slide adapter and projector in which the adapter supports a stack of slides above the projecting position. Suitable means are provided operating in timed relation from a normal position for transporting a projected slide, if any, back to the channel, pushing the returned slide into the slide take-up unit of the channel, gripping the second slide in the slide supply unit of the channel, releasing the first or leading slide in the supply unit, and transporting the released slide to the projecting position.

The invention and advantages thereof other than those set forth will be apparent from the following description when read in connection with the accompanying drawings, in which:

FIG. 2 is a segmental top plan view of the structure of FIG. 1 with portions thereof broken away;

FIG. 4 is a side elevation view partially in section of the opposite side of the slide adapter of FIG. 3;

FIG. 5 is a segmental side elevation view partially in section substantially taken along line 5–5 of FIG. 2 and showing the projector in its normal slide projecting position;

FIG. 6 is a top plan view of FIG. 5;

FIG. 7 is a segmental side elevation view similar to FIG. 5 showing the projector with the projected slide returned to the channel;

FIG. 8 is a top plan view of FIG. 7;

FIG. 9 is a view similar to FIG. 7 showing the returned slide being forced into the slide take-up unit of the channel, and the first or leading slide in the supply unit released and ready for transport to the projecting position;

FIG. 10 is a top plan view of FIG. 9;

Figure 11:
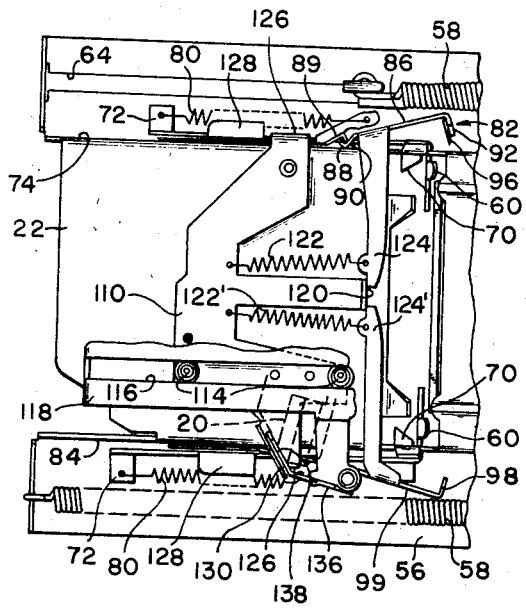
FIG. 11 is a segmental bottom view of FIG. 4 showing the slide adapter in its normal position.
Figure 12:
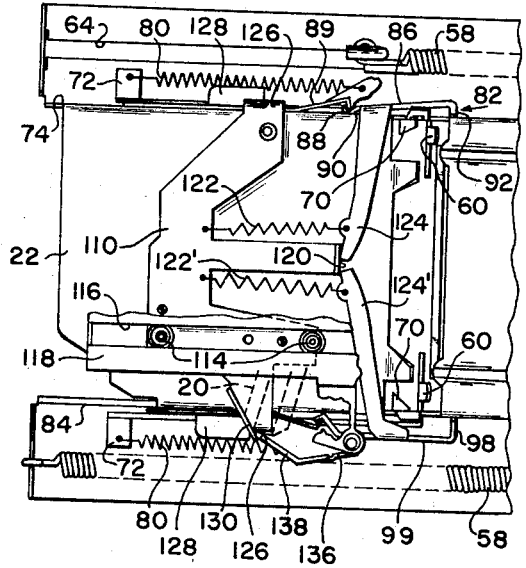
Figure 13:
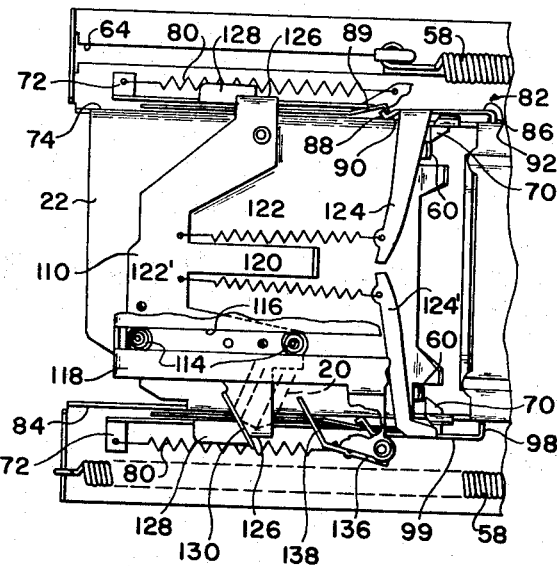

FIG. 12 is a view similar to FIG. 11 showing the slide adapter in a position in which the projector indexing pawl has engaged and moved the slide adapter member a short distance to the left; and FIG. 13 is a view similar to FIGS. 11 and 12 showing the slide adapter in a position in which the projector indexing pawl has engaged and moved a slide adapter member to the left to its furthermost position.

Figures 1, 3:
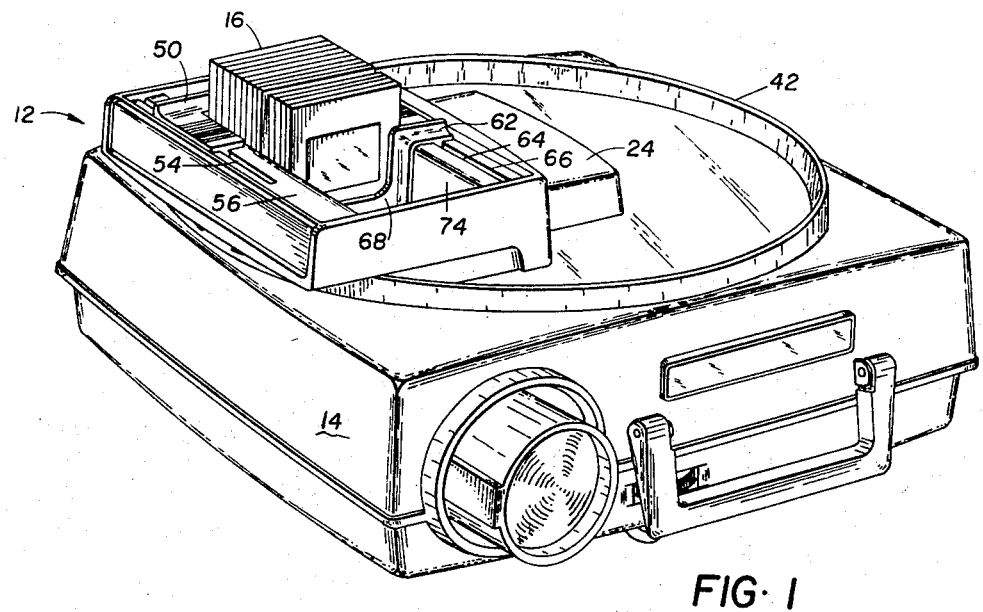
FIG. 1 is a perspective view of a combined stack slide adapter and projector of this invention.
FIG. 3 is a perspective view from the lower left hand corner of the slide stack adapter with portions of its housing broken away for purposes of clarity.

Referring to the drawings, the top load stack slide adapter 12 is mounted on a projector 14 of the type disclosed in U.S. Patent 3,276,314, having incorporated therein a tray indexing mechanism of the type disclosed in issued U.S. Patents 3,236,113 and 3,319,370. In a projector of this type, during a single cycle of operation of the projector from its normal slide projecting position, a projected slide 16, if any, is returned to a slide holding means, the slide holding means indexed, and a different slide lowered by a slide transport means 18 into the projecting position. A projector of this type is provided with an indexing pawl 20 of the indexing mechanism which is adapted to be moved between spaced indexing pins on a slide tray, and then moved angularly in the direction of the arrow as seen in FIG. 3 of U.S. Patent 3,236,113 for advancing the tray in a forward direction. This indexing pawl 20 (see FIG. 1) and related indexing mechanism (not shown) provides the motive force for operating the top load stack slide adapter 12 which is mountable on the projector 14. Since the indexing and slide transporting mechanisms are clearly and concisely described in the aforementioned U.S. patents 3,236,113, 3,276,314, and 3,319,370 they will not be described in further detail in this application.

The top load stack slide adapter 12 comprises a generally U-shaped channel 22 mounted in a plastic molded housing 24, and having a central opening 26 in its bottom 112 adapted to register with complementary openings in housing 24 and a slide projecting station or gate 28 of projector 14 when the adapter 12 is mounted thereon. To properly locate adapter 12 on projector 14, the housing 24 has a bore 30 at one end for receiving a complementary post 32 on projector 14 as seen in FIG. 2. In addition, the housing 24 has an opening 34 for receiving a complementary pin 36 on projector 14, and further has a slot 38 along the lower front for receiving an inwardly extending rib 40 on a rim 42 of projector 14. These cooperating parts serve to hold the stack slide adapter 12 and housing 24 in a fixed position with the openings thereof in register with projection gate 28.

The channel 22 of slide adapter 12 provides a slide supply unit 44 on one side of opening 26 and a slide take-up unit 46 on the opposite side. A slide pressure plate 48 is pivotally mounted on a bracket 50 having a depending rib 52 slidably mounted in a slot 54 in a channel flange 56, and urged by a spring 58 in a direction for pressing a stack of slides 16 in supply unit 44 against a pair of slide arresting or stop shoes 60. Another similar bracket 62 is slidably mounted in a slot 64 of the opposite flange 66 of channel 22, and has a fixed plate 68 for urging slides 16 in take-up unit 46 against a pair of spring mounted, beveled slide retainers 70.

Each of the stop shoes 60 is integrally formed with a plate 72 guided for reciprocal movement along sides 74 and 84 of channel 22 by means of a pair of cooperating elongated slots 76 and pins 78. Each of the plates 72 is urged by a spring 80 toward the stack of slides 16.

The top load stack slide adapter 12 is provided with a slide gripper 82 for engaging one side of the second slide 16 in supply unit 44 and urging the slide into frictional engagement with the opposite side 84 of channel 22. The purpose of this is to releasably hold the second slide in its original position so that it and the remaining slides 16 in the stack will not be advanced by spring 58. Accordingly, the leading or front slide 16 can then be freed or released for transport without any interference from the remaining slides. The gripper 82 comprises a bracket 86 pivotal about bent ends 88 of a pair of spaced fingers 90 held into engagement with a side 74 of channel 22 by a pair of leaf springs 89. The bracket 86 has a lug 92 extending through an opening 94 in side 74 of channel 22, and a knife 96 secured to lug 92 for engaging the edge or side of a slide 16. The knife 96 of gripper 82 and stop shoes 60 are spaced along channel 22 one and a half slide thicknesses apart so that knife 96 will always engage the middle of the second slide in supply unit 44. To accommodate slides 16 of variable thicknesses, lug 92 and knife 96 may be mounted on a slider, not shown, provided with a calibrated index and a set screw for varying the position of knife 96 with respect to stop shoes 60 so that knife 96 may be properly positioned to accommodate slides 16 of any thickness. Naturally, once knife 96 is set to accommodate a slide of a predetermined thickness, all slides used must be of the same thickness.

The slide adapter 12 is further provided with a slide pusher lug 98 formed by a bracket 99 supported on the opposite side wall 84 of channel 22 for separating the first or leading slide 16 in supply stack 44 from the remaining slides, and for providing a stop for the second slide. The slide pusher bracket 99 is similar to gripper bracket 86 having a pair of spaced fingers 100 with bent ends 102 that are urged into engagement with side 84 of channel 22 by a pair of leaf springs 104 and about which pusher bracket 99 pivots. The pusher 98 extends through a slot 108 in side wall 84 and is spaced relative to the stop shoe 60 approximately a half slide thickness for engaging one edge of the first or leading slide abutting stop shoe 60, and extending in front of the second slide approximately a half slide thickness to provide a stop therefor.

The movement of the gripper 82, pusher 98 and stop shoes 60 in proper timed relation is accomplished by means of a control plate 110 mounted for reciprocal movement on the bottom 112 of channel 22 by virtue of pins 114 on plate 110 slidable along a slot 116 in a guide plate 118 secured to bottom 112 of channel 22 as best seen in FIG. 3. The control plate 110 has an abutment 120 at one end, and springs 122' are provided for urging arms 124' carried by gripper and pusher brackets 86, 99 respectively into engagement with abutment 120. The control plate 110 has transverse lugs 126 extending along each side 74, 84 of channel 22 for engaging lips 128 on stop plates 72 for reciprocally moving plates 72 against the bias of their springs upon movement of control plate 110. The control plate 110 has a depending, inclined lug 130 that is engageable by indexing pawl 20 on slide projector 14 when the slide projector is actuated to change slides. The indexing pawl 20 as it is moved angularly in a direction which would normally index a tray in a forward direction, engages inclined lug 130 and urges control plate 110 against the bias of springs 122, 122' for operating the gripper 82, pusher 98 and stop shoes 60 in proper timed relation. To prevent plates 72 and stop shoes 60 from returning to their original positions too rapidly, thereby not allowing sufficient time for the released slide to be moved downwardly a sufficient distance to clear the returning stop shoes, a pivotal spring biased retard lever 136 is provided having an arm 138 adapted to drop behind indexing pawl 20 causing it to return more slowly to its original position.

In the operation of this invention, adapter 12 is initially mounted on a slide projector 14 as indicated heretofore with the slide openings in the housing and channel 22 in register with the slide projecting station or gate 28. A stack of slides 16 to be projected is interposed between plate 48 and the stop shoes 60. The slide projector 14 is in its normal position with slide transport member 18 in its lowermost position for holding a slide 16, if any, in the projecting station 28 for projection as seen in FIG. 5. Upon operation of slide projector 14 through one cycle of operation as clearly explained in the aforementioned U.S. patents, the slide transport member 18 moves to its uppermost position as seen in FIG. 7 to return a previously projected slide to a slide return position A, and then is returned to its lowermost position for transporting a new slide to the projecting station 28. During such cycle of operation, when transport member 18 is in the uppermost position, the indexing mechanism is operated causing pawl 20 to actuate control plate 110, and following the operation of the indexing mechanism, transport member 18 is returned to its normal lowermost position. During the operation of slide projector 14, it is obvious that during the initial portion of the cycle of operation, a slide 16, if any, in the projecting station 28 will be placed into the slide return position A in channel 22 as seen in FIG. 7. At that point, the indexing mechanism is operated causing indexing pawl 20 to urge control plate 110 in its forward direction causing gripper 82 to engage one edge of the second slide and to urge its opposite edge into engagement with side 74 of channel 22, causing pusher 98 to engage one edge of the first or leading slide and free it from the second slide and provide a stop for the second slide, and causing stop shoes 60 to engage the returned slide and to urge it past the beveled edges of retainers 70 camming them out of the way of the slide, the retainers 70 returning to their normal position for holding the slide in the take-up unit 46. Upon completion of this cycle of operation, the transport member 18 is returned to its lowermost position transporting the released first or leading slide into the projecting station 28 for projection. During this cycle of operation, a pressure plate 134, as described in the aforementioned U.S. Patent 3,276,314 is moved to an open position for releasing the slide in the projecting station 28 before transport member 18 begins its upward movement, and then is returned to its slide holding, pressure engaging position after the next slide 16 is moved into the projecting station 28.

The invention has been described in detail with particular reference to one embodiment thereof, but it will be understood that variations and modifications can be effected within the spirit and scope of the invention as described hereinabove, and as defined in the appended claims.

I claim:
1. In a slide projector, the combination comprising:
a slide projecting station;
a slide return position to which a slide is moved from said slide projecting station;
slide supply means adjacent said slide return position for supporting a stack of slides in side by side relation, said supply means further including means for urging the stack of slides toward said slide return position;
slide take-up means adjacent said slide return position for receiving a slide from said slide return position;
means for transporting a slide from said slide projecting station to said slide return position, and the leading slide of said stack of slides to said slide projecting station;

stop means for arresting the stack of slides and mounted for movement from said arresting position in said supply means across said slide return position into said take-up means and back to said holding position;

means for gripping a slide adjacent to the leading slide in the supply means for holding the adjacent slide and remaining slides in the stack against the force exerted by the urging means, and mounted for movement between slide gripping and non-gripping positions; and means for moving said gripping means, stop means and transporting means in timed relation causing said gripping means to grip the adjacent slide, said transporting means to return any slide being projected to the slide return position, said stop means to be moved away from the leading slide releasing said slide and urging the returned slide from the slide return position into the take-up means, and said transporting means to transport the released leading slide to the projecting station.

2. The invention according to claim 1 wherein said slide supply and take-up means are positioned above said slide projection station.

3. The invention according to claim 1 wherein said slide supply and take-up means are positioned above said slide projecting station and said slide return position is between said slide supply and take-up means substantially in register with said slide projecting station.

4. The invention according to claim 1, and further including means operating in timed relation with said gripping means, stop means, and transporting means for engaging and pushing said leading slide to insure its release from the second slide, and providing a stop for said adjacent slide.

5. In a slide projector, the combination comprising:
  slide take-up means;
  slide supply means on the same level as said slide take-up means for a stack of slides in side by side relation, and having a spring for biasing the stack toward said take-up means;
  a slide projecting station;
  means for transporting a slide from said slide projecting position to a slide return position between and at substantially the same level as said supply and take-up means, and for transporting the leading slide from the stack of slides to said slide projecting station;
  stop means for arresting the stack of slides and mounted for movement from said arresting position across said slide return position into said slide take-up means and back again;
  means for gripping a slide adjacent to the leading slide in the supply means for holding the adjacent slide and remaining slides in the stack against the force of said spring, and mounted for movement between slide gripping and non-gripping positions; and
  means for moving said gripping means, stop means and transporting means in timed relation causing said gripping means to grip the adjacent slide, said transporting means to return any slide being projected to the slide return position, said stop means to be moved away from the leading slide releasing said slide and urging the returned slide from the slide return position into the take-up means, and said transporting means to transport the released leading slide to the projecting station.

6. The invention according to claim 5, and further including means operating in timed relation with said gripping means, stop means, and transporting means for engaging and pushing said leading slide to insure its release from the second slide, and providing a stop for said adjacent slide.

7. The invention according to claim 5 wherein said slide supply and take-up means are portions of a slide support member, said member further defining a passageway between said supply and take-up means through which said transporting means transports a slide from said slide projecting station to said slide return position, said slide projecting station being positioned below said slide support member.

8. In a slide stack adapter for a slide projector of the type having a slide guideway; a slide projecting station, means for transporting a slide from said slide projecting station through said slide guideway and back to said slide projecting station, means for indexing a slide tray, and means for operating said transporting means and indexing means in timed relation; the improvement comprising:
  a slide support member having slide take-up means, slide supply means for a stack of slides in side by side relation and having a spring for biasing the stack toward the slide take-up means, said slide support member further defining a passageway between said take-up and supply means;
  means on said slide projector cooperating with means on said slide support member for mounting said slide support member on said slide projector with said guideway in register with said passageway;
  stop means for arresting the stack of slides and mounted for movement from said arresting position across the passageway into said slide take-up means and back again;
  means for gripping a slide adjacent to the leading slide in the supply means for holding the adjacent slide and remaining slides in the stack against the force exerted by said spring, and mounted for movement between slide gripping and non-gripping positions; and
  means for moving said stop means and gripping means for movement in timed relation;
  said means for moving further being responsive to the operation of said indexing means for causing said gripping means to grip the adjacent slide as said transporting means returns any slide being projected through said guideway and passageway into said slide support member, and said stop means to be moved away from the leading slide releasing said leading slide and urging the returned slide into said take-up means as said transporting means transports the released leading slide to said projecting station.

9. The invention according to claim 8 and further including means operating in timed relation with said gripping means, stop means, and transporting means for engaging and pushing said leading slide to insure its release from the second slide, and providing a stop for said adjacent slide.

10. The invention according to claim 8 wherein said stop means comprises a reciprocally movable first plate having a first lug, said gripping means comprises a spring biased pivotal bracket having a slide engaging lug and an arm, and said means for moving comprises a reciprocally movable second plate against which said arm is biased, said second plate having a first lip for engaging said first lug, and a second depending lip engageable by said indexing means for reciprocally moving said second plate.

11. In a slide stack adapter, the combination comprising:
  slide supply means for supporting a stack of slides in side by side relation;
  slide take-up means adjacent said slide supply means;
  said slide supply and take-up means defining a slide passageway therebetween through which individual slides are transportable for projection;
  stop means for arresting a stack of slides in said slide supply means and mounted for movement from said arresting position across said passageway into said slide take-up means and back again;
  means for gripping a slide adjacent to the leading slide in said slide supply means, and mounted for movement between slide gripping and non-gripping positions; and
  means for moving said stop means and said gripping means for movement in timed relation causing said gripping means to grip the adjacent slide and said stop means to move from said arresting position across said passageway to release said leading slide for movement through said passageway and to urge a projected slide returned through said passageway into said slide take-up means.

12. The invention according to claim 11 and further including means operated in timed relation with said gripping and stop means for engaging and pushing said leading slide to insure its release from the next adjacent slide.

13. The invention according to claim 11 and further including means for engaging and pushing said leading slide to insure its release from the next adjacent slide, said engaging and pushing means being operatively connected to said gripping and stop means by said means for moving.

14. The invention according to claim 11 wherein said slide supply and take-up means comprises a channel member.

15. The invention according to claim 14 wherein said stop means comprises a reciprocally movable first plate mounted on said channel member and having a first lug, said gripping means comprises a spring biased bracket pivotally mounted on said channel member and having a slide engaging lug and an arm, and said means for moving comprises a reciprocally movable second plate mounted on said channel member and against which said arm is biased, said second plate having a first lip for engaging said first lug, and means by which said second plate may be moved.

References Cited
UNITED STATES PATENTS

| | | | |
|---|---|---|---|
| 2,705,437 | 4/1955 | Lessman | 40—79 X |
| 2,814,965 | 12/1957 | Lacoe | 40—78 X |
| 3,238,653 | 3/1966 | Wiklund | 40—79 |
| 3,273,454 | 9/1966 | Bast | 40—79 X |
| 3,352,205 | 11/1967 | Brinkmann | 40—79 Y |

EUGENE R. CAPOZIO, *Primary Examiner.*

RICHARD CARTER, *Assistant Examiner.*

UNITED STATES PATENT OFFICE
CERTIFICATE OF CORRECTION

Patent No. 3,427,739 February 18, 1969

Herbert T. Robinson

It is certified that error appears in the above identified patent and that said Letters Patent are hereby corrected as shown below:

Column 1, line 19, "stock" should read -- stack --; line 59, after "forth" insert -- above --. Column 5, line 4, "holding" should read -- arresting --.

Signed and sealed this 24th day of March 1970.

(SEAL)
Attest:

Edward M. Fletcher, Jr.
Attesting Officer

WILLIAM E. SCHUYLER, JR.
Commissioner of Patents